United States Patent
Chaudhari et al.

(10) Patent No.: US 10,955,004 B2
(45) Date of Patent: Mar. 23, 2021

(54) WIRE-FORMED BEARING CAGE

(71) Applicant: The Timken Company, North Canton, OH (US)

(72) Inventors: Rahul Chaudhari, North Canton, OH (US); Robert Ringle, Canton, OH (US); Douglas H. Smith, Copley, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 16/971,029

(22) PCT Filed: Oct. 9, 2019

(86) PCT No.: PCT/US2019/055345
§ 371 (c)(1),
(2) Date: Aug. 19, 2020

(87) PCT Pub. No.: WO2020/076916
PCT Pub. Date: Apr. 16, 2020

(65) Prior Publication Data
US 2021/0003174 A1    Jan. 7, 2021

Related U.S. Application Data

(60) Provisional application No. 62/743,876, filed on Oct. 10, 2018.

(51) Int. Cl.
*F16C 33/54* (2006.01)
(52) U.S. Cl.
CPC ........ *F16C 33/541* (2013.01); *F16C 2220/40* (2013.01); *Y10T 29/49691* (2015.01)

(58) Field of Classification Search
CPC ...... F16C 33/42; F16C 33/425; F16C 33/427; F16C 33/54; F16C 33/541; F16C 2220/40; Y10T 29/49691
See application file for complete search history.

(56) References Cited

U.S. PATENT DOCUMENTS

| | | | |
|---|---|---|---|
| 1,389,385 A | 8/1921 | Robson |
| 1,783,141 A | 11/1930 | Russell |
| 3,644,971 A | 2/1972 | Axbard |
| 4,212,095 A | 7/1980 | Warchol |

(Continued)

FOREIGN PATENT DOCUMENTS

| DE | 2150982 A1 | 4/1973 |
|---|---|---|
| DE | 102008014552 A1 | 9/2008 |

(Continued)

OTHER PUBLICATIONS

International Search Report and Written Opinion for Application No. PCT/US2019/055345 dated Jan. 3, 2020 (12 pages).

*Primary Examiner* — Alan B Waits
(74) *Attorney, Agent, or Firm* — Michael Best & Friedrich LLP (57) ABSTRACT

A bearing cage is formed from a single piece of wire bent into shape and includes a first axial end ring, a second axial end ring including a distal end of the single piece of wire, a plurality of axially-extending bridge portions between the first and second axial end rings, and a plurality of circumferentially-extending connection portions interconnecting adjacent bridge portions. The connection portions are alternately positioned adjacent the first and second axial end rings.

21 Claims, 9 Drawing Sheets

(56) References Cited

U.S. PATENT DOCUMENTS

| | | | |
|---|---|---|---|
| 5,291,655 A | 3/1994 | Benson et al. | |
| 5,404,642 A | 4/1995 | Alling et al. | |

FOREIGN PATENT DOCUMENTS

| | | |
|---|---|---|
| DE | 102015213115 A1 | 1/2017 |
| GB | 148627 A | 7/1920 |
| GB | 584120 A1 | 1/1947 |
| GB | 1604570 A | 12/1981 |

WIRE-FORMED BEARING CAGE

RELATED APPLICATIONS

This application claims the benefit of U.S. Provisional Patent Application No. 62/743,876 filed Oct. 10, 2018, the entire content of which is hereby incorporated by reference herein.

BACKGROUND

The present invention relates to bearings, and more particularly to cages for rolling elements of bearings.

SUMMARY

In one aspect, the invention provides a bearing cage formed from a single piece of wire bent into shape. The cage includes a first axial end ring, a second axial end ring including a distal end of the single piece of wire, a plurality of axially-extending bridge portions between the first and second axial end rings, and a plurality of circumferentially-extending connection portions interconnecting adjacent bridge portions. The connection portions are alternately positioned adjacent the first and second axial end rings.

In another aspect, the invention provides a bearing assembly including an inner ring, a plurality of rollers positioned on the inner ring, and the above-described bearing cage retaining the plurality of rollers on the inner ring.

In another aspect the invention provides a method of making a bearing cage from a single piece of wire. The method includes forming a first axial end ring, after forming the first axial end ring, deviating the wire from the first axial end ring and forming a plurality of axially-extending bridge portions and a plurality of circumferentially-extending connection portions to form a plurality of roller pockets, and after forming the plurality of roller pockets, deviating the wire from a last-formed roller pocket to form a second axial end ring.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
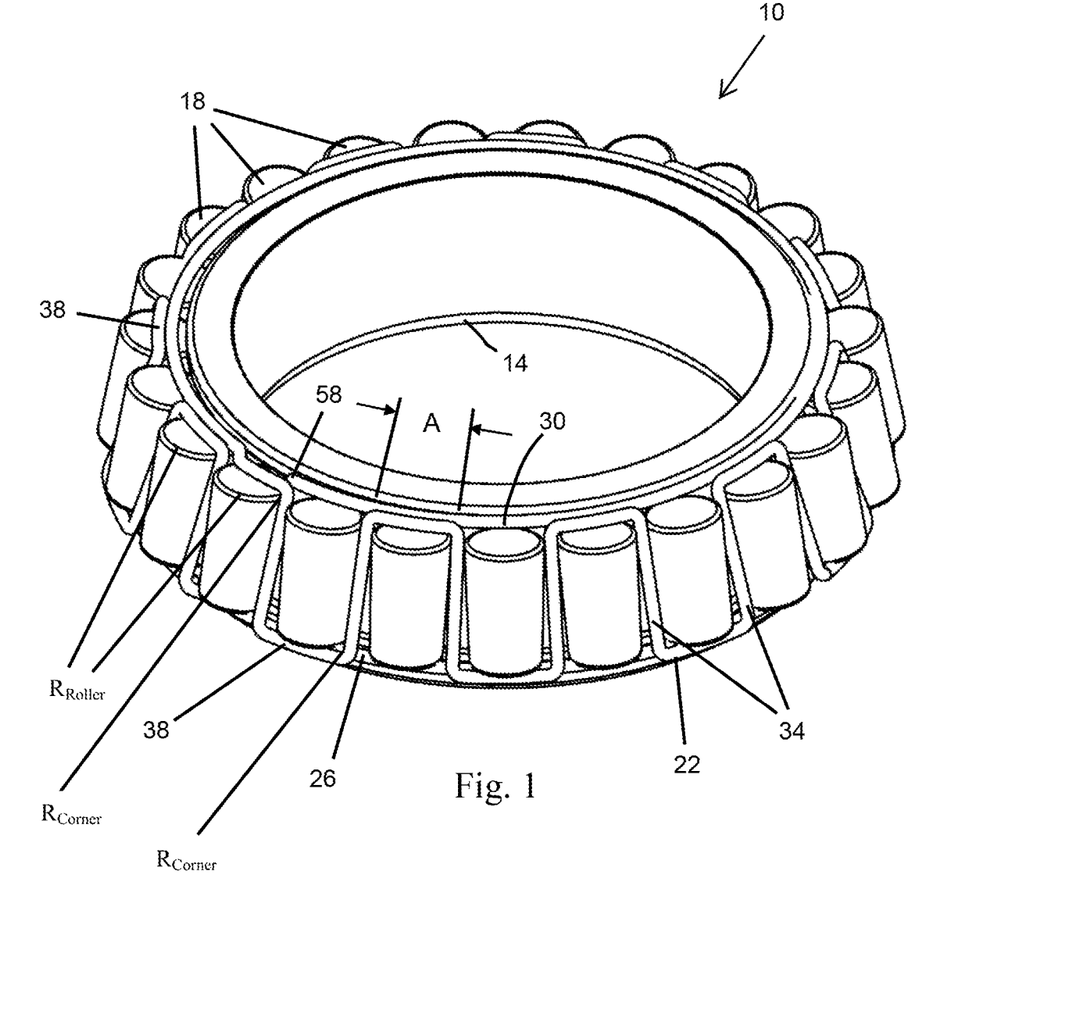
FIG. 1 is a perspective view of a portion of a tapered roller bearing assembly illustrating the inner ring and a plurality of rolling elements supported on the inner ring by a cage embodying the present invention.

FIG. 1 illustrates a portion of a tapered roller bearing assembly 10 including an inner ring or cone 14 defining thereon a raceway for supporting a plurality of rolling elements in the form of tapered rollers 18. The rollers 18 are retained in position on the inner ring 14 by a cage 22 embodying the present invention. The outer ring or cup of the bearing assembly 10 has been removed to reveal the rollers 18 and the cage 22.

Referring to FIGS. 1-4, the cage 22 is formed from a single piece of material that is bent into the final form of the cage 22. In the illustrated embodiment, the cage material is 1020 steel, round gauge wire of about forty thousandths of an inch (0.040 in.) in diameter, which can equate to 19 or 20-gauge wire. By using round gauge wire, the contact between the cage 22 and the outer diameter surface of the rollers 18 is a line contact engagement due to the engagement between the generally cylindrical roller 18 and the cylindrical wire of the cage 22. This reduces friction between the rollers 18 and the cage 22 as compared to traditional stamped cages in which the planar stamped material presents a larger contact area with the rollers 18. Furthermore, the illustrated cage 22 has a reduced amount of material between rollers 18 and an overall lower weight as compared to traditional stamped cages. This enables the cage 22 to be designed to add one more roller 18 to the bearing assembly than if a traditional stamped cage were to be used for that same bearing assembly. By enabling the addition of an extra roller 18, the cage 22 increases the load-carrying capacity of the bearing assembly as compared to the same bearing assembly with a traditional stamped cage. In other embodiments, different wire material, cross-sectional shape, and size can be used to fit the particular bearing application.

The single piece of wire is formed into the final-form cage 22 to include a first axial end ring 26, a second axial end ring 30, a plurality of axially-extending bridge portions 34 between the first and second axial end rings 26, 30, and a plurality of circumferentially-extending connection portions 38 interconnecting adjacent bridge portions 34. The connection portions 38 are alternately positioned adjacent the first and second axial end rings 26, 30. In the illustrated embodiment, the connection portions 38 are positioned adjacent the end rings 26, 30 at a location radially outside of the adjacent end rings 26, 30. In the illustrated embodiment, the connection portions are aligned with the end rings 26, 30 in the radial direction. Likewise, the bridge portions 34 are also positioned radially outside of the adjacent end rings 26, 30. In this configuration, the bridge portions 34 and connection portions 38 together form pockets 42 located radially inside of the roller pitch circle to retain the rollers 18 and hold them in position when placed on the inner ring 14, as shown in FIG. 1. However, in alternative constructions, the bridge portions 34 and the connection portions 38 can be positioned adjacent the end rings 26, 30 at a location radially inside of the adjacent end rings 26, 30. Additionally, the pockets 42 can alternatively be located radially outside of the roller pitch circle.

With reference to FIG. 1, each roller 18 has a roller end radius $R_{Roller}$ that defines a transition between the roller end face and the outer circumferential surface of the roller 18. The pockets 42 of the cage 22 each define cage corner radii $R_{Corner}$ at each internal corner that are smaller than the roller end radius $R_{Roller}$. For example, a roller end radius $R_{Roller}$ may be about 1.0 mm, while the cage corner radii $R_{Corner}$ may be about 0.5 mm. The wire gauge and material properties should be selected to enable achieving this relationship.

With respect to the tapered roller bearing assembly 10, the adjacent bridge portions 34 define a taper angle or total included angle A therebetween for receiving tapered rollers 18. The taper angle A can range from 1 degree to 50 degrees depending on the rollers 18. In one embodiment, the taper angle is between 4 and 20 degrees. Additionally with a tapered roller bearing assembly 10, the first and second axial end rings 26, 30 have different diameters Dinner and Dourer (see FIG. 3). The cage 22 has an axial length L (see FIG. 4).

Figure 2A:
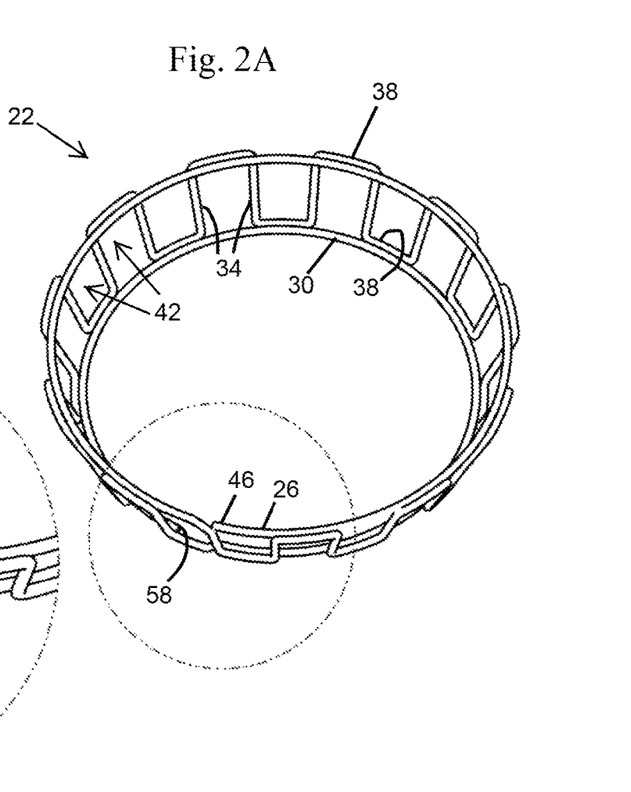
FIG. 2A is a perspective view of the cage of FIG. 1.
Figure 2B:
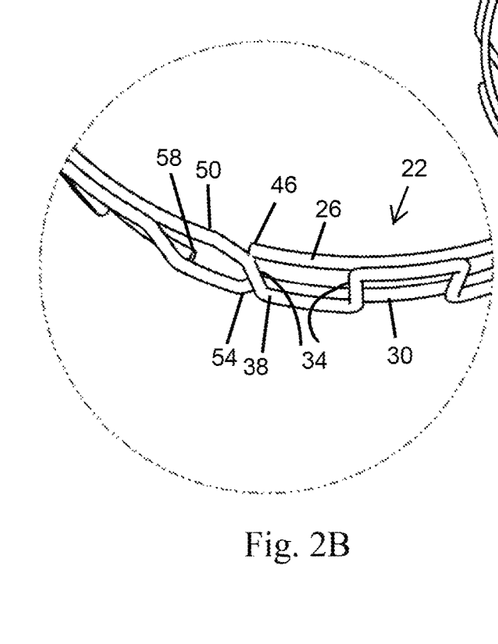
FIG. 2B is an enlarged partial view of FIG. 2A showing the distal ends of the wire forming the cage.

The cage 22 is formed from the single piece of wire either manually using a fixture or by an automated wire forming machine. As best shown in FIG. 2B, a first distal end 46 of the wire starts, and is included in, the first axial end ring 26. The first axial end ring 26 is formed first, and once the wire is formed nearly to its 360 degree arc (to complete the first axial end ring 26), the wire deviates or bends radially outwardly at point 50 until it overlies or nearly overlies the distal end 46. The wire then deviates or bends axially to form a bridge portion 34, followed by a connection portion 38, followed by another bridge portion 34, and so on around the circumferential length of the cage 22 until all of the roller pockets 42 are formed. Next, at point 54, the wire deviates radially inwardly from the last-formed roller pocket 42, adjacent the interface of the first-formed bridge portion 34 and the first-formed connection portion 38, to begin forming the second axial end ring 30. The second axial end ring 30 is completed at the second distal end 58, which in the illustrated embodiment terminates adjacent the interface of the last-formed bridge portion 34 and the last-formed connection portion 38. Therefore, in the illustrated embodiment, the distal ends 46 and 58 are spaced apart in the circumferential direction by the circumferential length of one roller pocket 42, and are on opposite axial ends of the cage 22. In the case where the cage 22 is formed from a large coil of wire, the supply coil of wire can be cut after the cage 22 is formed to form the second distal end 58.

Figure 2C:
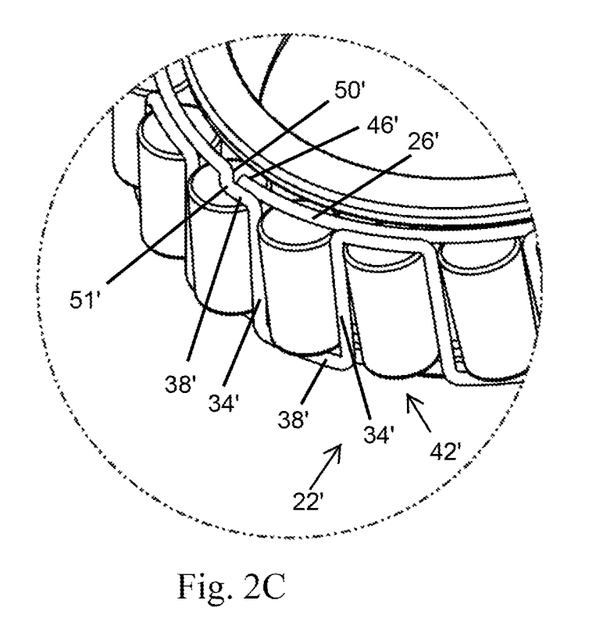
FIG. 2C is an enlarged partial view showing an alternative distal end arrangement of the wire forming the cage.

FIG. 2C illustrates a variation of the bend arrangement shown in FIG. 2B. As in FIG. 2B, the first distal end 46' starts, and is included in, the first axial end ring 26'. However, the radially outward deviation at point 50' is the first of two radial bends, and a second deviation point 51' begins the formation of the first-formed connection portion 38' via a second radial bend. This first-formed connection portion 38' radially overlies or overlaps the first distal end 46' as shown, thereby eliminating any potential gap, and providing a potentially more robust design. The wire then deviates or bends axially to form a bridge portion 34', followed by a connection portion 38', followed by another bridge portion 34', and so on around the circumferential length of the cage 22' until all of the roller pockets 42' are formed. Unlike the single radial bend/deviation at point 50 in FIG. 2B, the dual-bend arrangement in FIG. 2C requires two radial-direction bends at points 50' and 51'. Therefore, a designer can determine whether the potentially added robustness of the design justifies the extra radial-direction bend.

Figure 2D:
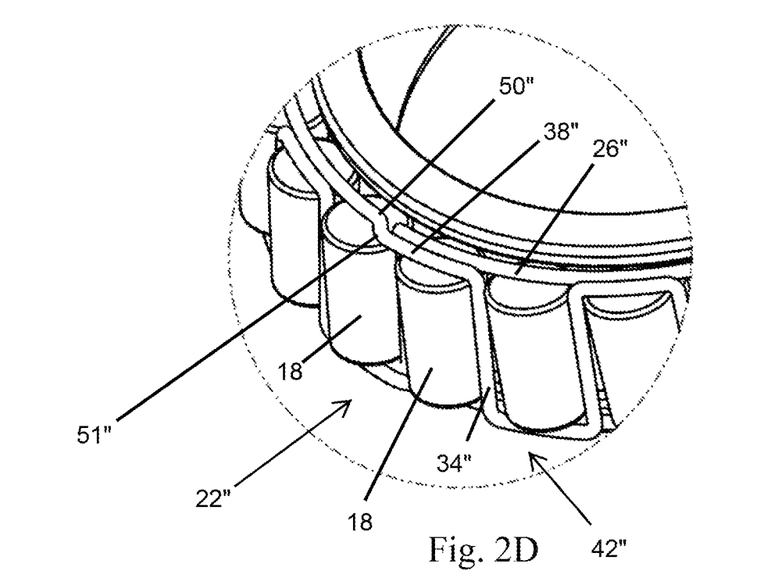
FIG. 2D is an enlarged partial perspective view of a tapered roller bearing assembly similar to that of FIG. 2C but with one additional roller.
Figure 2E:
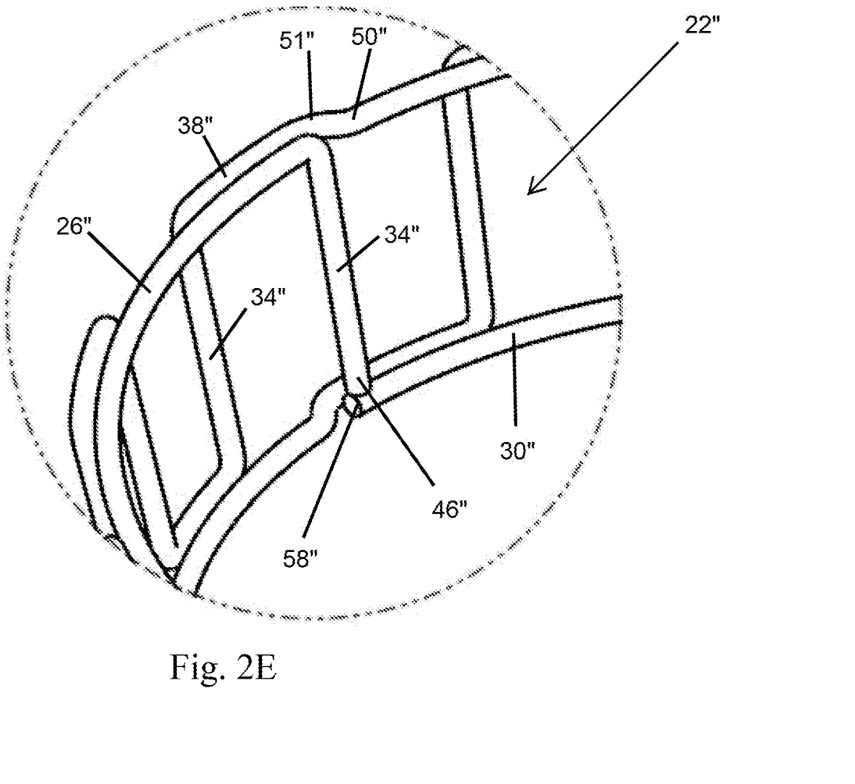
FIG. 2E is an enlarged partial perspective view of the cage used with the tapered roller bearing assembly of FIG. 2D.
Figure 3:
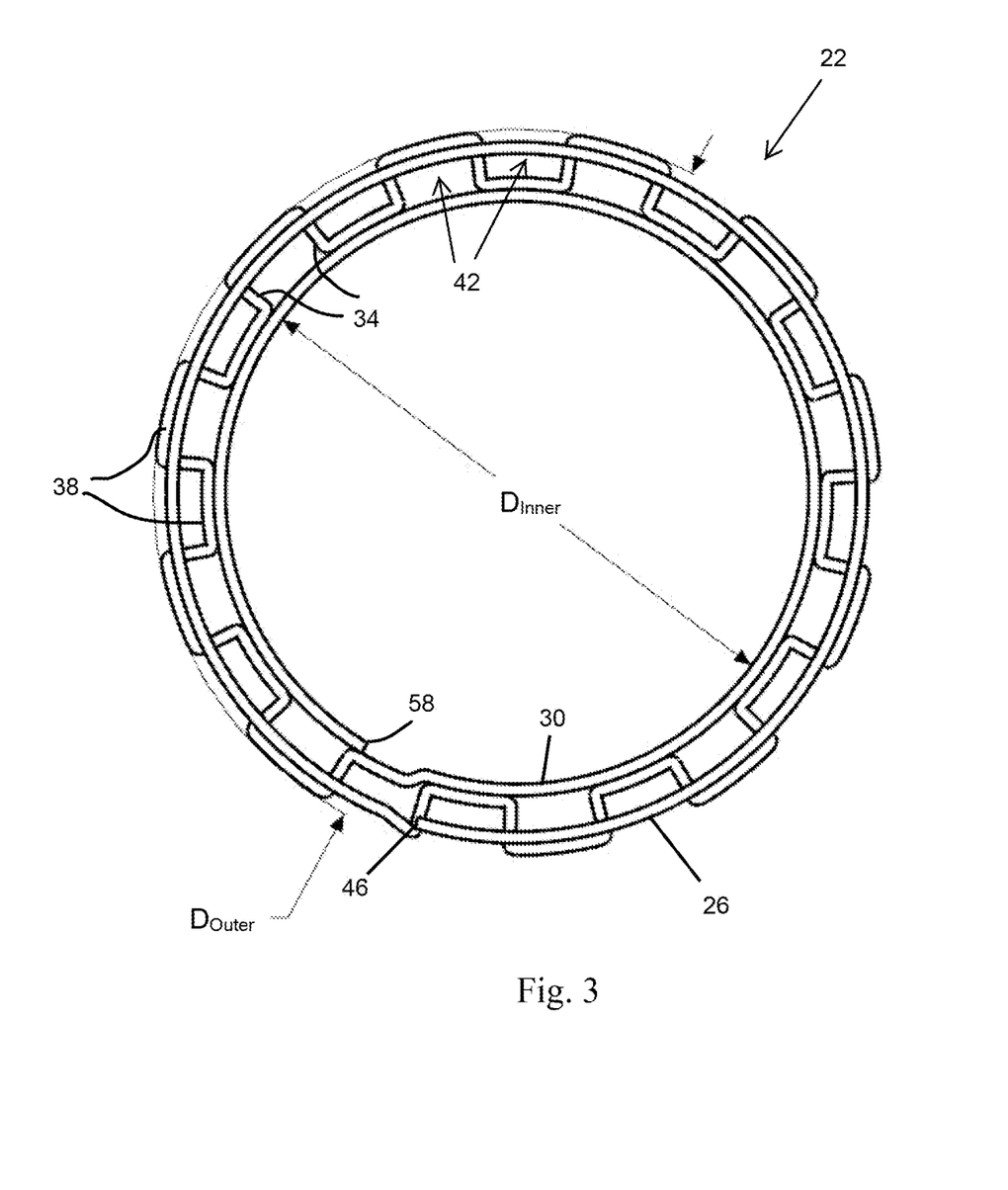
FIG. 3 is an end view of the cage of FIG. 1.
Figure 4:
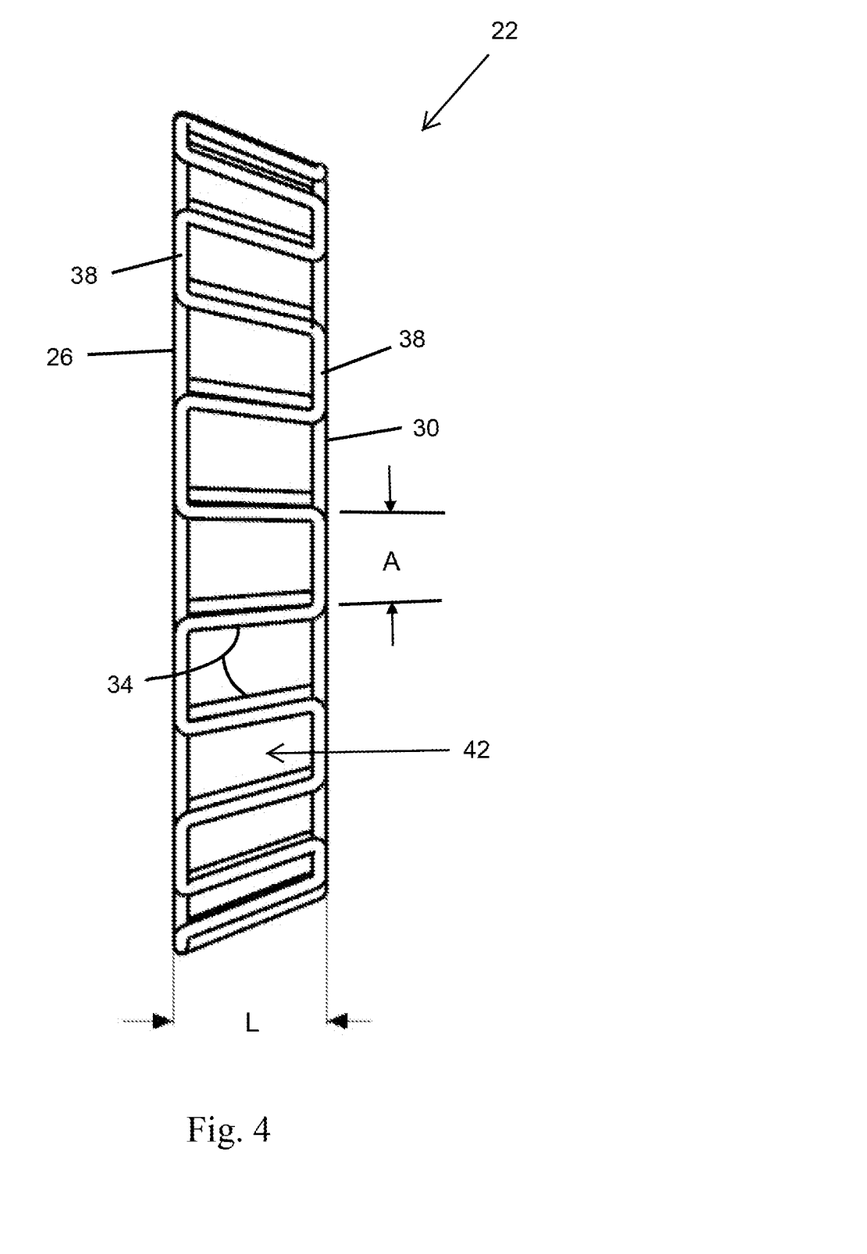
FIG. 4 is a side view of the cage of FIG. 1.

FIG. 2D illustrates a tapered roller bearing assembly similar to that shown in FIG. 2C, except that instead of having twenty-three rollers 18 (as illustrated in FIGS. 1 and 2C), the bearing assembly of FIG. 2D includes twenty-four rollers 18. FIG. 2E illustrates the cage 22" of the assembly of FIG. 2D. The cage 22" is similar to the cage 22' except that the first distal end 46" is at the end of a bridge portion 34" and is adjacent to the second distal end 58" at the second axial end ring 30". In other words, both distal ends 46" and 58" are adjacent the second axial end ring 30" (see FIG. 2E) instead of one distal end defining the end of each respective axial end ring. Thus, unlike the other cages 22, 22', the cage 22" has the second distal end 58" forming the end of the second axial end ring 30", but has the first distal end 46" defining an end of a bridge portion 34" that terminates near or in abutment with the second axial end ring 30" at the second distal end 58". In some embodiments, this arrangement can be used for other cages designed to contain an even number of rollers 18, while the arrangements shown in FIGS. 2B and 2C can be used for other cages designed to contain an odd number of rollers 18. There is also more overlap of the first-formed connection portion 38" downstream of the bend point 51" with the first axial end ring 26". In other words, the first-formed connection portion 38" is longer than the first-formed connection portion 38' of cage 22'. To state it yet another way, the distance from the bend point 51" to the first bridge portion 34" extending off the first axial end ring 26" of the cage 22" is greater than the distance of the first bend point 51' to the first bridge portion 34' extending off the first axial end ring 26' of the cage 22'. This arrangement provides one additional pocket 42" for the added roller 18.

In the illustrated embodiments, no welding, brazing, or other joining technique or process is used to complete the cages 22, 22', or 22". Portions of the wire overlap, overlie, or abut other portions, but no welding, brazing, adhesive joining, or other mechanical joinder of the wire portions is performed. Likewise, the distal ends 46,46', 46" and 58, 58', and 58" are not mechanically joined to any other portion of the wire. This makes the formation of the cages 22, 22', 22" faster and less expensive than that of cages where welding, brazing, adhesives, or other joining techniques are required.

Figure 5:
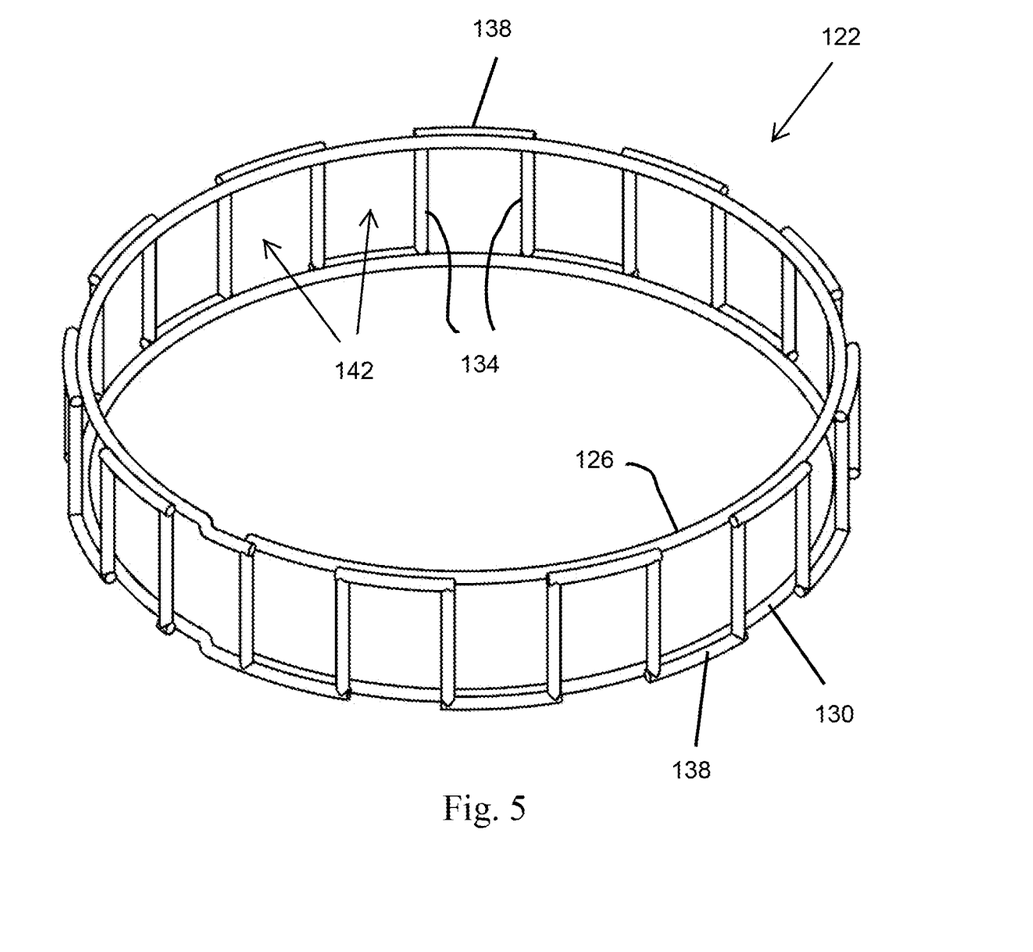
FIG. 5 is a perspective view of an alternative cage for use with a cylindrical roller bearing assembly.

FIG. 5 illustrates a cage 122 that is similar in construction to the cage 22, but is a cage for a cylindrical roller bearing assembly. Like parts have like reference numerals of the 100 series. Because the cage 122 is for a cylindrical bearing, the first and second axial end rings 126, 130 have the same diameter. Likewise, there is no taper angle between the bridge portions 134. The forming technique is the same as described above for the cage 22, but is modified to achieve the slightly different geometry of the cage 122.

Figure 6A:
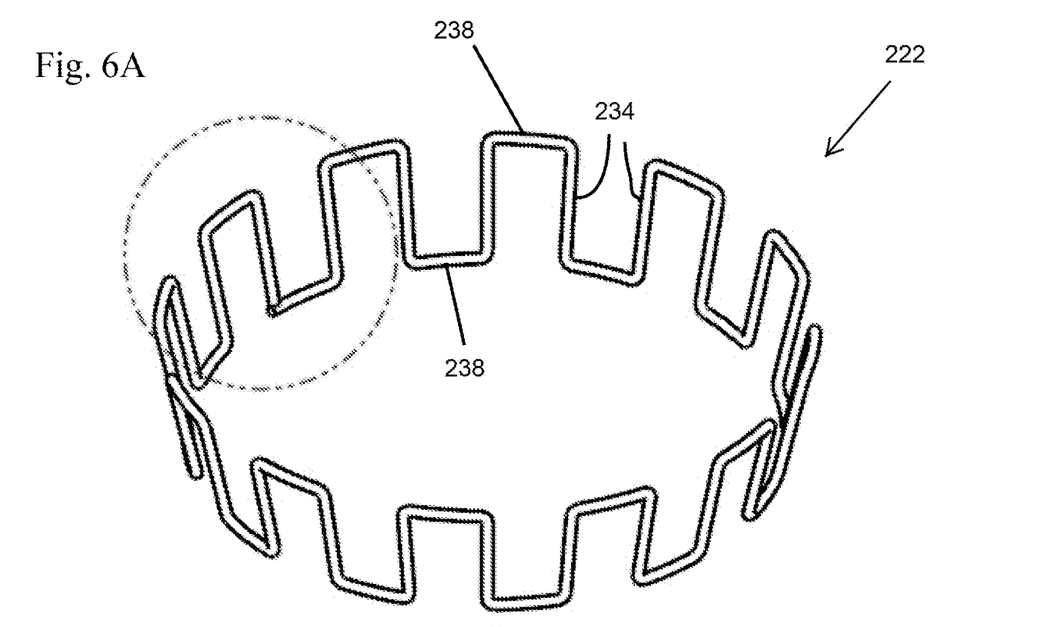
FIG. 6A is a perspective view of yet another alternative cage without axial end rings.
Figure 6B:
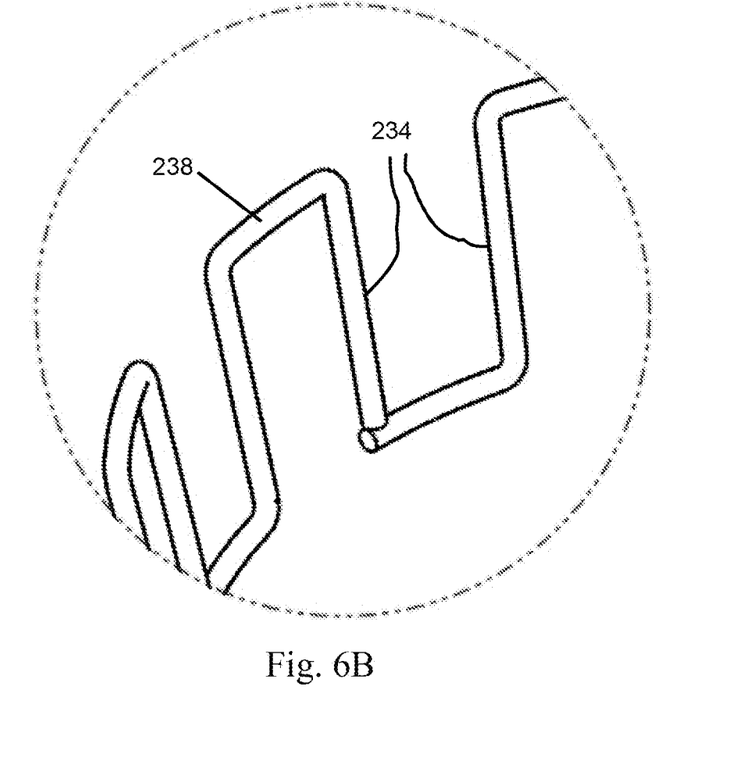
FIG. 6B is an enlarged partial perspective view of the cage of FIG. 6A
Figures 7A, 7B:
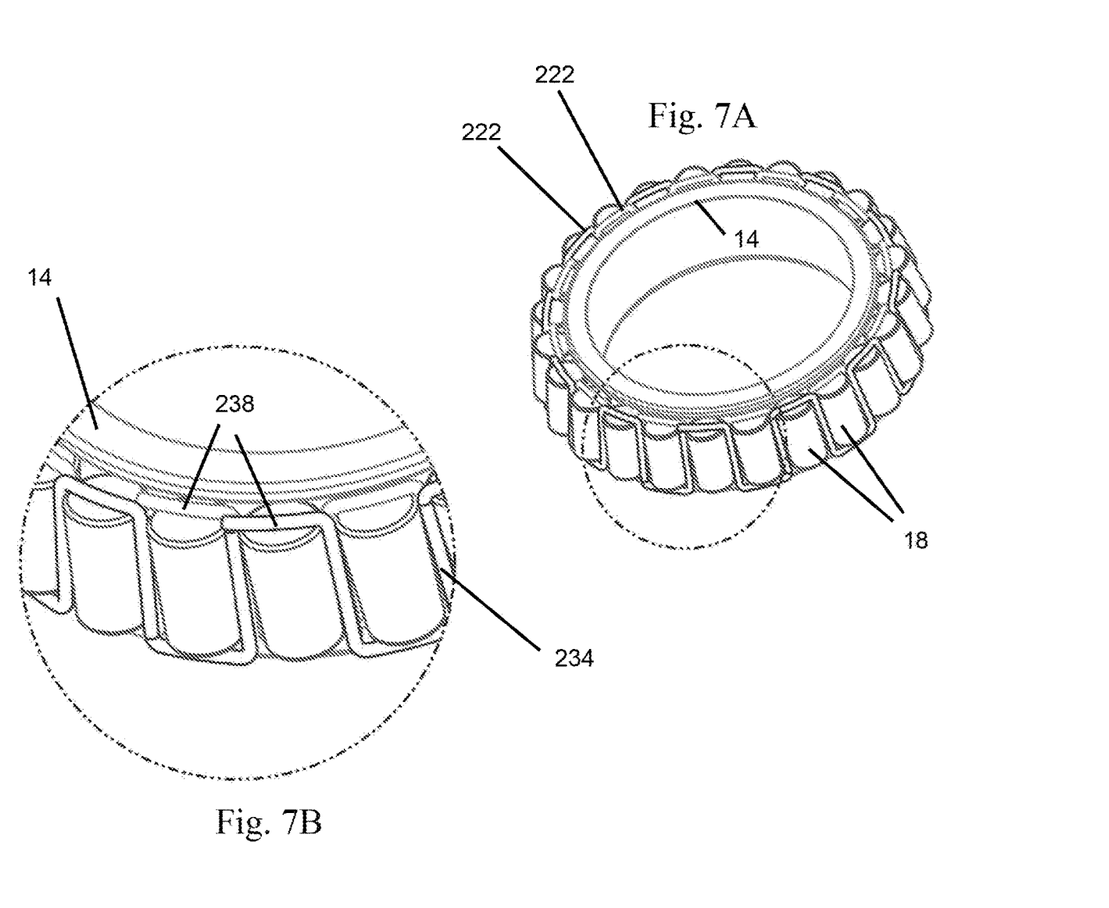
FIG. 7A is a perspective view of a portion of a tapered roller bearing assembly illustrating the inner ring and a plurality of rolling elements supported on the inner ring by two of the cages shown in FIG. 6A.
FIG. 7B is an enlarged partial perspective view of the assembly of FIG. 7A.

FIGS. 6A and 6B illustrate a cage 222 that is like the cage 22 except that it does not include any axial end rings. Instead, the cage 222 includes only a meandering form that defines the bridge portions 234 and the connection portions 238. The distal ends of the wire can be welded together, or can merely abut (see FIG. 6B). Referring now to FIGS. 7A and 7B, to retain the tapered rollers 18 in an assembly, two of the cages 222 are used, radially offset from one another, and incremented circumferentially by one roller pocket such that each roller 18 has a connection portion 238 adjacent both ends to retain the rollers 18. In other words, one cage 222 is positioned above the roller pitch diameter and the other cage 222 is positioned below the roller pitch diameter. In this manner, no axial end rings are needed.

The above cages are believed to perform as well or better than conventional stamped cages, and will be faster and less expensive to manufacture. In preliminary testing, no noticeable wear pattern was detected on the cages. No modifications to the rollers or the inner and outer bearing rings are needed for the bearing assemblies to incorporate these free-floating cages. The cages 22, 22', and 22" will be stiffer than the cage 222 due to the added end rings 26, 30, 26', 30', 26", 30". Therefore, some applications may favor the use of the stiffer cages 22, 22', 22", while other applications may favor the use of the less stiff cage 222.

Various features and advantages of the invention are set forth in the following claims.

What is claimed is:

1. A bearing cage formed from a single piece of wire bent into shape, the cage comprising:
    a first axial end ring;
    a second axial end ring including a distal end of the single piece of wire;
    a plurality of axially-extending bridge portions between the first and second axial end rings; and
    a plurality of circumferentially-extending connection portions interconnecting adjacent bridge portions, the connection portions alternately positioned adjacent the first and second axial end rings.

2. The bearing cage of claim 1, wherein adjacent bridge portions define a taper angle therebetween to define pockets for receiving tapered rollers, the taper angle being between 1 and 50 degrees.

3. The bearing cage of claim 2, wherein the taper angle is between 4 and 20 degrees.

4. The bearing cage of claim 1, wherein the first and second axial end rings have different diameters.

5. The bearing cage of claim 1, wherein no mechanical welds, brazes, or joinders are made on the cage.

6. The bearing cage of claim 1, wherein the bridge portions and connection portions are positioned radially outside of the first and second axial end rings.

7. The bearing cage of claim 1, wherein the distal end of the single piece of wire included on the second end ring is a second distal end of the wire, and wherein a first distal end of the single piece of wire is on the first axial end ring.

8. The bearing cage of claim 7, wherein adjacent bridge portions define therebetween pockets for receiving rollers, and wherein the bearing cage includes an odd number of pockets.

9. The bearing cage of claim 1, wherein the distal end of the single piece of wire included on the second end ring is a second distal end of the wire, and wherein a first distal end of the single piece of wire is on a bridge portion and is adjacent or abutting the second axial end ring.

10. The bearing cage of claim 9, wherein the first distal end is adjacent or abutting the second distal end.

11. The bearing cage of claim 9, wherein adjacent bridge portions define therebetween pockets for receiving rollers, and wherein the bearing cage includes an even number of pockets.

12. A bearing assembly comprising:
    an inner ring;
    a plurality of rollers positioned on the inner ring; and
    the bearing cage of claim 1 retaining the plurality of rollers on the inner ring.

13. The bearing assembly of claim 12, wherein the rollers each include a roller end radius that is greater than a cage corner radius defined at each internal corner interface between adjacent bridge portions and connection portions.

14. A method of making a bearing cage from a single piece of wire, the method comprising:
    forming a first axial end ring;
    after forming the first axial end ring, deviating the wire from the first axial end ring and forming a plurality of axially-extending bridge portions and a plurality of circumferentially-extending connection portions to form a plurality of roller pockets; and
    after forming the plurality of roller pockets, deviating the wire from a last-formed roller pocket to form a second axial end ring.

15. The method of claim 14, wherein no welding of the single piece of wire is performed.

16. The method of claim 14, further comprising cutting the single piece of wire to form a distal end of the wire after forming the cage.

17. The method of claim 16, wherein the distal end forms part of the second axial end ring.

18. The method of claim 14, wherein deviating the wire from the first axial end ring includes deviating the wire radially outwardly, and wherein deviating the wire from the last-formed roller pocket includes deviating the wire radially inwardly.

19. The method of claim 14, wherein forming the plurality of roller pockets includes providing a taper angle between adjacent bridge portions of between 1 and 50 degrees.

20. The method of claim 19, wherein forming the plurality of roller pockets includes providing a taper angle between adjacent bridge portions of between 4 and 20 degrees.

21. The method of claim 14, wherein no mechanical joining is performed on the single piece of wire.

* * * * *